July 8, 1969

C. H. WILEY 3,454,062

BENCH SAW MOULDING HEAD GUIDE

Filed Feb. 21, 1967

INVENTOR

*CALVERT H. WILEY*

ATTORNEY 3,454,062
BENCH SAW MOULDING HEAD GUIDE
Calvert H. Wiley, San Antonio, Tex.
(Rte. 2, Harrodsburg, Ky. 40330)
Filed Feb. 21, 1967, Ser. No. 617,676
Int. Cl. B27b 27/02; B27c 5/04
U.S. Cl. 144—253   3 Claims

ABSTRACT OF THE DISCLOSURE

A guide assembly for clamping on a saw table to support and guide a workpiece past a moulding cutter.

---

This device can be described as a tool or guide to be mounted on the table of a bench saw for utilization when the saw has been removed and replaced by a moulding cutter. The device guides the work to the cutting head and supports the finished product in such a manner as to insure a smooth finished cut throughout the entire length of the work piece.

Some comparable devices are known in the prior art which are designed for use in conjunction with wood shapers and planers. These known devices, however, could not possibly be used on a bench saw to convert it into a safe, efficient shaper and joiner.

The attachment may be constructed of sheet metal forming an L-shaped structure, a cutout is provided for the moulding head cutter, a guide fence or safety rail preferably of wood is adjustably positioned opposite the fence, a rest plate is secured to the base of the device to support the finished work, adjustable clamps attach the device to the bench saw table.

The present conventional bench saw, when adapted to utilize a moulding head, is quite dangerous in operation in that the hand or a finger is apt to contact the cutter head unless extreme care is exercised by the operator. Another disadvantage of the existing device is the fact that the finished work is not supported properly which results in an uneven cut and waste of the last three to five inches of the work.

One object of this invention is to support the finished work securely at an increased elevation equal to the depth of the cut to insure a smooth cut throughout the length of the work.

A second object is to provide a device which is substantially safer to operate than the existing device.

Another object is to construct one device in such a configuration as to be adaptable for use with various designs of bench saws.

Other objects and advantages will become apparent to one skilled in the art as the detailed description and operation of the device are studied.

Figure 1:
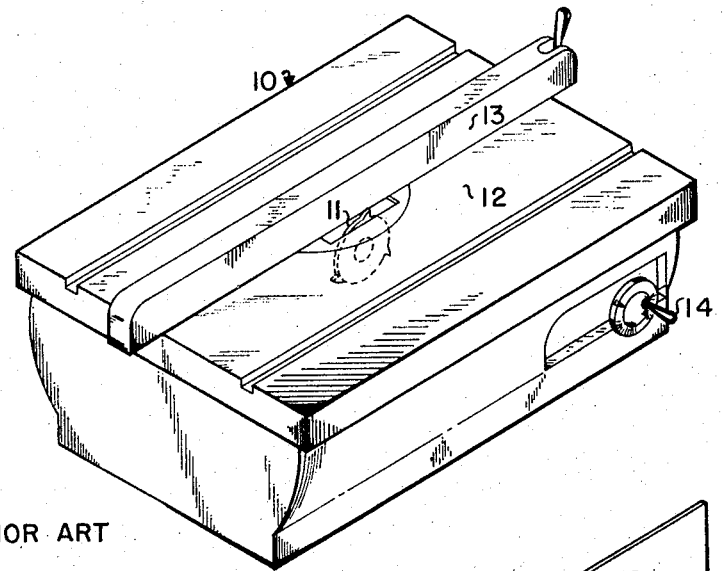
FIG. 1 is an isomeric view of a conventional bench saw with a moulding cutter head utilizing the existing guide fench which is well known in the art.

Referring now to the drawings wherein like reference characters designate similar or identical components throughout the various views. FIG. 1 depicts a conventional bench saw assembly 10 wherein the saw has been removed and replaced by a moulding cutter head 11. The work to be finished would in the existing device be supported by the saw table 12 and guided through the cutter 11 by guide fence 13. The moulding cutter head 11 can be raised or lowered by means of the adjusting crank 14 which enables the depth of the cut to be varied as desired.

Figure 2:
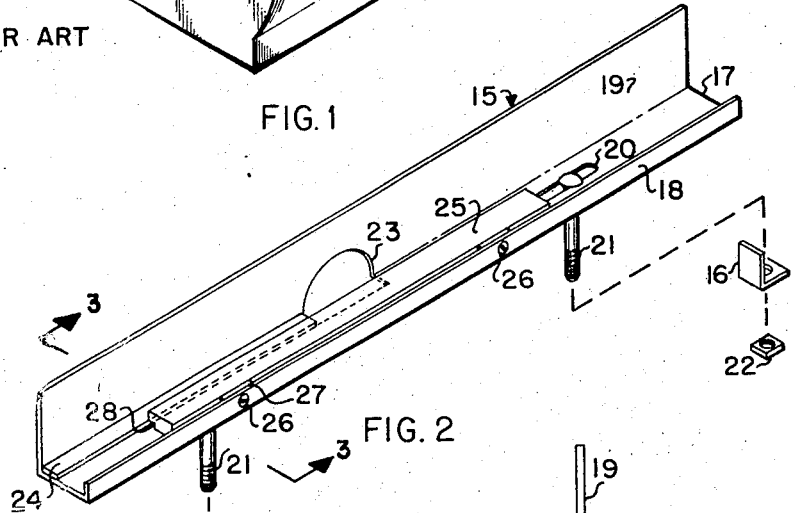
FIG. 2 is an isometric view of the preferred embodiment of this invention including an exploded view of the clamps by which the device may be secured to the bench saw.

In the preferred embodiment of this device, the guide fence 13 can be removed from the bench saw assembly 10 and replaced by the bench saw moulding head guide 15 illustrated in FIG. 2. The device is aligned at right angles to the moulding cutter head 11 and the upper right edge of the saw table 12 as shown in FIG. 1. The device might well be assisted into position by means of the existing guide fence 13 which may remain in place or be removed. The bench saw moulding head guide 15 is then attached to the saw table 12 by means of the securing clamps 16.

The bench saw moulding head guide 15 is primarily constructed of one-eighth (1/8) inch sheet metal which is formed or stamped in an L configuration so as to form base 17 with an outer secondary guide fence 18 and a primary guide fence 19. The securing clamps 16 previously referred to are mounted in slots 20 in the base 17 by means of bolts 21 and nuts 22 or wing nuts. Firmly secured to the base 17 adjacent the primary guide fence 19 between the cutter slot 23 and the end of the device through which the finished work moves is a rest plate 24. Adjacent the rest plate 24 and the secondary guide fence 18 there is adjustably mounted a safety guide 25. This safety guide 25, preferably made of wood, is adjustably secured to the secondary guide fence 19 by means of adjusting screws 26 and shims 27. The safety guide 25 is constructed with a notch 28 in its lower portion which permits the safety guide to protect over the rest plate 24 thereby permitting adjustments of the safety guide which will firmly support a work piece of less thickness than the width of the rest plate. These adjustable features permit the safety guide 25 to be positioned at a desired distance from the primary guide fence 19 which will firmly support the work piece as it is processed through the cutter head 11.

Figure 4:
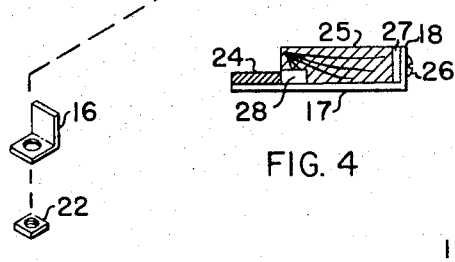
FIG. 4 is a sectional view of a modified embodiment of the device constructed without an integral guide fence, view is comparable to FIG. 3.
Figure 3:
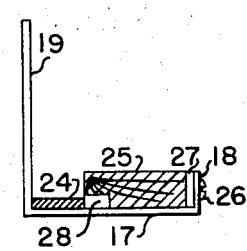
FIG. 3 is a sectional view of FIG. 2 taken on line 3—3 looking in the direction of the arrows.

A modification of the preferred embodiment of this invention is partially illustrated in FIG. 4. This species of the invention is identical in all respects to the bench saw moulding head guide 15 described in detail above with the exception; this embodiment is constructed without a primary guide fence 19. This species of the invention is designed in such a manner as to utilize the existing guide fence 13 of the bench saw assembly 10. Such a species is operable and is superior to all existing known devices, however, the complete bench saw moulding head guide 15 is preferred in that it is more stable and vibration free in its operation and its work product is superior.

In placing the device of this invention into operation, the bench saw moulding head guide 15 is properly aligned on the saw table 12. A straight edge or an elongated adjusting gauge, preferably made of metal, is placed on the rest plate 24 with the straight edge or adjusting gauge projecting over the cutter head 11. The adjusting crank 14 is utilized to raise or lower the cutter head 11 to a position at which the lowest point on the upper contour of the cutter head 11 is on an exact plane with the surface of the rest plate. A board of the thickness to be worked is used as a gauge to adjust the distance between the safety guide 25 and the primary guide fence 13. When shims 27 of the required thickness have been inserted and the adjusting screws 26 tightened, the invention is ready for operation.

The equipment is turned on and a board or work piece fed into the machine. The edge of the board is placed in the slot between the safety guide 25 and the primary guide fence 19. As the work passes over the cutter head 11 the desired shaping and cut is accomplished. The finished work is supported by the rest plate at a level above the surface of the base 17 equal to the depth of the cut. This results in a smooth cut with a steady, relatively vibration free processing of the work piece for its entire length.

It is recognized that only one preferred embodiment of the device has been disclosed and described in detail and one additional species or modification has been illustrated and described. What is desired to be claimed is all modifications or equivalents of the foregoing disclosure which do not depart from the scope or spirit of the invention and the appended claims.

1. An elongate bench saw moulding head guide comprising:
   (a) A base member,
   (b) A guide fence perpendicular to said base member extending for subtsantially the full length of said base member,
   (c) A moulding cutter head aperture in said base member intermediate the ends thereof,
   (d) A rest plate secured to said base member parallel to and spaced from said guide fence and extending from a point adjacent said aperture in a direction toward one end of said base member,
   (e) Clamping means attached to said base member for securing said base to a saw table, an elongate safety guide carried by said guide fence, said guide fence acting to position said safety guide adjacent to and parallel with said rest plate, whereby a workpiece can slide on said rest plate and be guided by said safety guide past said cutter head aperture.

2. The invention of claim 1 including a secondary guide fence perpendicular to said base member and substantially opposite and parallel to said first mentioned guide fence.

3. The invention of claim 1 including adjustable means capable of varying the distance between said safety guide and said first mentioned guide fence.

References Cited

UNITED STATES PATENTS

| 3,127,417 | 3/1965 | Zulkowitz et al. | 144—134 |
| 3,209,800 | 10/1965 | Leibow | 144—134 |

ANDREW R. JUHASZ, *Primary Examiner.*

G. WEIDENFELD, *Assistant Examiner.*

U.S. Cl. X.R.

143—168; 144—134